SOUND WAVE TRANSMITTING DEVICE

Filed Jan. 21, 1965 16 Sheets-Sheet 1

INVENTORS
JACQUES CHOLET
JEAN-PIERRE FAIL
BY Toulmin & Toulmin
ATTORNEYS

INVENTORS
JACQUES CHOLET
JEAN-PIERRE FAIL
BY Toulmin & Toulmin
ATTORNEYS

INVENTORS
JACQUES CHOLET
JEAN-PIERRE FAIL
BY Toulmin & Toulmin
ATTORNEYS

INVENTORS
JACQUES CHOLET
JEAN-PIERRE FAIL
BY Toulmin & Toulmin
ATTORNEYS

INVENTORS
JACQUES CHOLET
JEAN-PIERRE FAIL
BY Toulmin & Toulmin
ATTORNEYS

INVENTORS
JACQUES CHOLET
JEAN-PIERRE FAIL
BY Toulmin & Toulmin
ATTORNEYS

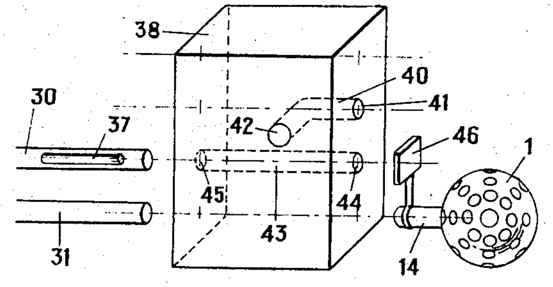
Fig. 4
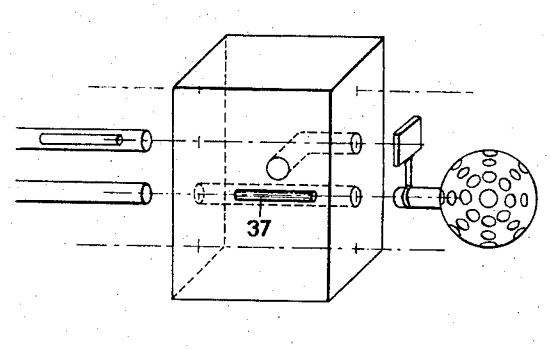
Fig. $4_A$
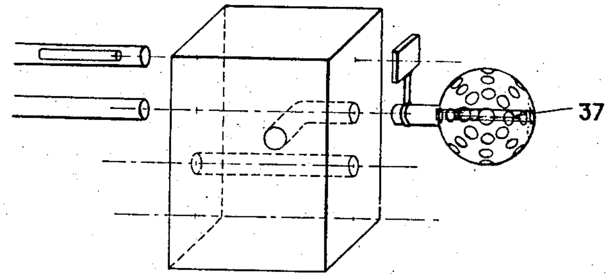
Fig: $4_B$
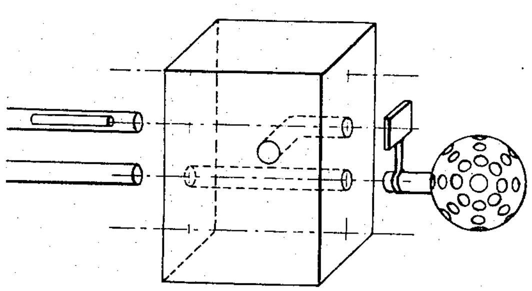
Fig. $4_C$
Fig. $4_D$
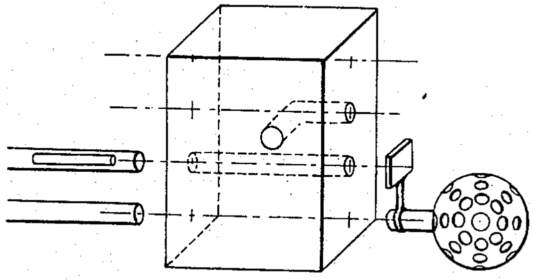
INVENTORS
JACQUES CHOLET
JEAN-PIERRE FAIL
BY Toulmin & Toulmin
ATTORNEYS INVENTORS
JACQUES CHOLET
JEAN-PIERRE FAIL
BY Toulmin & Toulmin
ATTORNEYS INVENTORS
JACQUES CHOLET
JEAN-PIERRE FAIL
BY Toulmin & Toulmin
ATTORNEYS INVENTORS
JACQUES CHOLET
JEAN-PIERRE FAIL
BY Toulmin & Toulmin
ATTORNEYS

SOUND WAVE TRANSMITTING DEVICE

Filed Jan. 21, 1965 16 Sheets-Sheet 11

INVENTORS
JACQUES CHOLET
JEAN-PIERRE FAIL

BY Toulmin & Toulmin
ATTORNEYS

INVENTORS
JACQUES CHOLET
JEAN-PIERRE FAIL
BY Toulmin & Toulmin
ATTORNEYS

INVENTORS
JACQUES CHOLET
JEAN-PIERRE FAIL
BY Toulmin & Toulmin
ATTORNEYS

SOUND WAVE TRANSMITTING DEVICE

Filed Jan. 21, 1965 16 Sheets-Sheet 14

INVENTORS
JACQUES CHOLET
JEAN-PIERRE FAIL
BY Toulmin & Toulmin
ATTORNEYS

INVENTORS
JACQUES CHOLET
JEAN-PIERRE FAIL
BY Toulmin & Toulmin
ATTORNEYS

INVENTORS
JACQUES CHOLET
JEAN-PIERRE FAIL
BY Toulmin & Toulmin
ATTORNEYS

United States Patent Office 3,368,641
Patented Feb. 13, 1968

3,368,641
SOUND WAVE TRANSMITTING DEVICE

Jacques Cholet, Rueil-Malmaison, and Jean-Pierre Fail, Paris, France, assignors to Institut Francais du Petrole des Carburants et Lubrifiants, Rueil-Malmaison, Seine-et-Oise, France Filed Jan. 21, 1965, Ser. No. 426,834
Claims priority, application France, Jan. 24, 1964, 961,562; July 8, 1964, 981,168; Oct. 10, 1964, 991,468
19 Claims. (Cl. 181—.5)

ABSTRACT OF THE DISCLOSURE

A device for effecting series of underwater explosions at a high rate of succession, adapted for marine seismic prospecting from a mobile installation by the use of explosive elements, each explosion being at a location substantially remote from said installation and at a predetermined depth, said installation comprising tube means and means for sequentially conveying said explosive elements through said tube means from said installation to said location, said tube means having a first end on said installation and a second end permanently immersed at said location during the firing of said explosions, means on said installation for feeding explosive elements at a high rate into said first end, means for firing said explosive elements at said second end, and switching means for controlling, by the closure of an electrical circuit, said firing means at the times selected for the explosions.

*Cross references to related applications*

Applicants claim priority under 35 U.S.C. 119 for French patent applications Nos. 961,562 filed Jan. 24, 1964; 981,168 filed July 8, 1964; and 991,468 filed Oct. 15, 1964.

In the marine seismic field, the method most frequently used for producing sound waves consists of detonating one or more explosive charges not far below the surface of the water. In that case the explosive charge used must be around 10 kilos in order to obtain adequate amplitude waves, so that the waves reflected by the different geological strata positioned under the bottom of the sea have an amplitude higher than that of the waves corresponding to the noise of the sea itself, and a clear recording of the reflected waves is then made.

It is already known that the method consisting of exploding the charge at a considerable depth or in the neighborhood of the underwater bottom gives equivalent results with much smaller charges. The result obtained by exploding a charge of about 100 g. at depth or near the sea bed is equivalent to that obtained by exploding a charge of about ten kilos near the surface.

However, exploding a charge at great depth or near bottom has the drawback of creating a bubble at the moment of the explosion. This bubble, immediately after the explosion and at the commencement of its ascent to the surface is, by reason of its elasticity, subject to pulsations similar to those experienced by a spring which is suddenly released. These pulsations cause disturbances which interfere with the seismic recording of the reflected waves.

Such disturbances can be avoided by placing the explosive charge in the center of a sphere perforated with numerous orifices of sufficient size for the pressure waves to be propagated through the liquid medium without damaging the sphere. The explosion then gives rise to a quantity of small bubbles which do not disturb the recordings.

This method may therefore be considered as advantageous but it nevertheless leaves a problem to be solved. When it is desired to carry out successive seismic firings at short intervals (from 15 seconds to 1 minute) from a surface installation, it is necessary to be able to reload the sphere with explosives quickly and regularly.

An object of this invention, therefore, is to make a device that will enable a perforated submerged sphere to be fed with explosive charges at short, regular intervals, and permit the charges to be set off at the same rate, and enabling the sphere to be flushed quickly after each explosion by a pressurized current of water so that the sphere is left clear of all foreign matter before arrival of the next explosive charge.

Another object of the invention is to carry out the explosion at the chosen moment under conditions of absolute safety.

A further object of the invention is to enable quick, easy handling of the sphere and its loading device, by means of a relatively small handling device.

According to the invention, these various objects are achieved by a system comprising a combination with an immersed foraminous sphere of at least one preferably flexible tube for loading the explosive and supporting the sphere at its immersed end, the other end being fixed to the surface installation, this tube being connected to the sphere by a device having means for setting off the explosion. The system also includes means on the surface installation for immersing and raising the sphere and tube comprising a convex track articulated at one end to the said surface installation, and separate handling means for the said track, the sphere and the unimmersed end of the tube.

For certain methods of utilizing the invention, means are provided for establishing pressurized water circulation in the tube at least one sliding barrel or rotating cartridge distributor placed on the tube between the pump and the sphere, and possibly also a magazine for storing the cartridges before they are loaded into the distributor.

According to other methods of utilizing the invention, the immersed end of the tube is connected to an electric terminal entering the sphere and connected to an open explosion chamber into which supply conduits run, distributing liquid components of an explosive mixture which forms in the said chamber, the latter being provided with means of firing the said explosive mixture.

The simplest device for utilizing the invention comprises a flexible tube fixed to the surface installation (e.g., a ship). One end of this tube is connected to a perforated sphere which is immersed. The other end is connected, through a cartridge distributor, to a pump on board the boat, so as to run water under pressure through the tube in the ship-to-sphere direction.

At first, the circulation of water under pressure in the tube is used to bring the cartridge through the tube into the sphere. At that moment, explosion is effected by a firing device carried by the cartridges according to the invention. Immediately afterwards, the same forced water circulation is used to wash out the inside of the sphere. The cycle than commences again, sending the cartridges along one by one at chosen intervals.

According to an improved method of making this device, given merely as an example, two flexible tubes are fixed to the boat and a pump is connected to each of the tubes so as to set up a circulation of water under pressure. On one of these tubes, downstream from the pump, a cartridge distributor is mounted on the boat, sending cartridges one by one into a magazine constituted by a portion of the tube upstream of the sphere. The second tube is also filled with a pump setting up a circulation of water under pressure. A second distributor is interposed between the end of the two flexible tubes and the sphere so as to ensure the transfer of cartridges from the magazine to the sphere.

A more detailed description of different methods of utilizing the invention is given below, as an example, with reference to the appended drawings, in which:

FIGS. 4, 4A, 4B, 4C and 4D show diagrammatically five positions of the sliding part of the distributor of FIG. 3, showing the transfer of cartridges from the magazine into the sphere.

Figure 1:
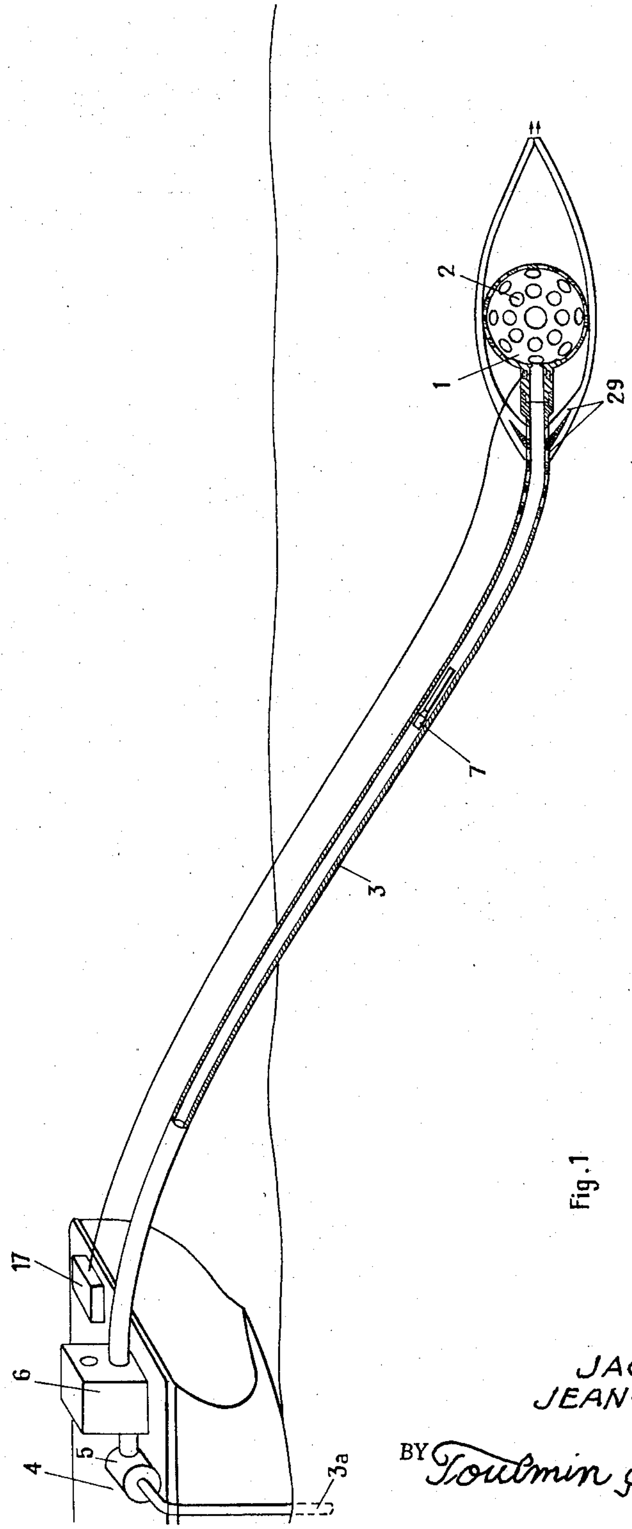
FIG. 1 is a longitudinal, partial cross-sectional view of one way of constructing the device.

The device shown in FIG. 1 comprises an immersed metal sphere 1, perforated by numerous orifices 2 and connected by a flexible tube 3 to a laboratory boat 4. A pump 5 sets up a circulation of water from the boat to the sphere through tube 3, the nonconnected end of which hangs freely in the water. A cartridge distributor 6, the operation of which will be explained in detail below, sends cartridges 7 into the tube 3 along which they are carried by the current of water under pressure until they reach the sphere 1.

Figure 1A:
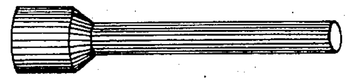
FIG. 1A is a perspective view of a type of cartridge that can be used in this device.
Figure 1B:
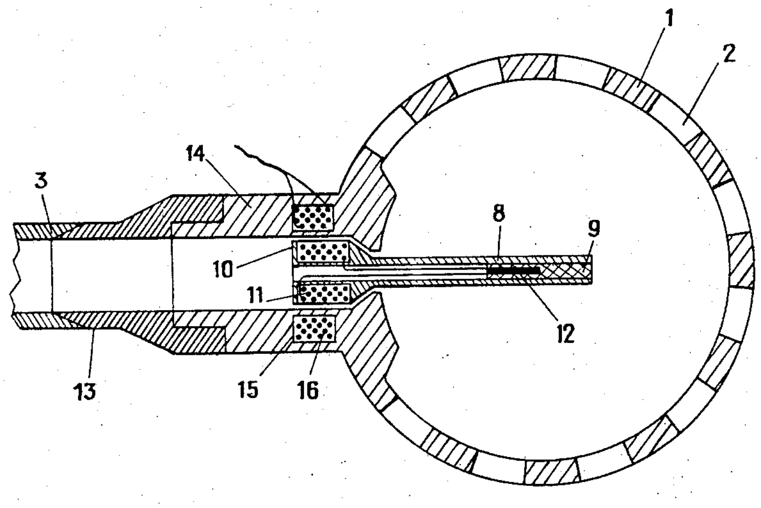
FIG. 1B is a cross-section of the sphere connected to the tube, and of the cartridge, as shown in FIG. 1A, in firing position in said sphere.

A cartridge 7, the shape of which may, for instance, be chosen as in FIG. 1A, takes its place in the sphere in the manner shown in FIG. 1B. In the example, the cartridge is composed of a tubular part 8 made of a material which is a non-conductor of electricity, such as glass, plastic or cardboard, containing at one end a given quantity of explosive matter 9, dynamite for instance, and a rear end 10 in which is lodged the winding of a coil 11, the ends of which are connected to a detonator 12.

The end of flexible tube 3 (FIGS. 1 and 1B) is fitted with an annular metal coupling 13 fitting a complementary metal coupling 14 which is integral with the sphere 1. The metal coupling 14 is machined in such a way that only the tubular part 8 of the cartridge enters the sphere 1, while the rear end 10 of the cartridge containing the coil remains in the coupling member 14 of the sphere. To this end, the internal diameter of the coupling 13 and of the adjacent end of coupling 14 is equal to the internal diameter of the flexible tube 3. In the part of the terminal 14 adjoining the sphere there is a shoulder which is encountered by the rear end 10 of the cartridge.

The length of the tubular part 8 of the cartridge is such that its end containing the explosive comes substantially in the center of the sphere 1.

The coupling member 14 contains a coil 16 housed in an annular space 15 placed so that the coil 16 is opposite the coil 11 of the cartridge when the rear end 10 of the cartridge is thrust against the corresponding shoulder.

The ends of the coil 16 are connected to a firing box 17 placed on board the boat 4 (FIG. 1).

Figure 1C:
FIG. 1C is a perspective view of a second type of cartridge according to the invention.

The cartridge may also be entirely tubular. In that case, illustrated in FIG. 1C and 1D, the cartridge skirt may consist of a tube longer than the diameter of the sphere 1 and containing coil 11, which may consist of a single layer winding.

The outside diameter of the cartidge is then not larger than the common inside diameter of flexible tube 3, its metal connection 13, and coupling member 14 of the sphere 1. The travel of the cartridge, sliding freely along the tube into the sphere, is limited by the inside wall of the sphere 1, where a part 18 for centering the cartridge is placed diametrically opposite the orifice where the cartridge enters.

Figure 1D:
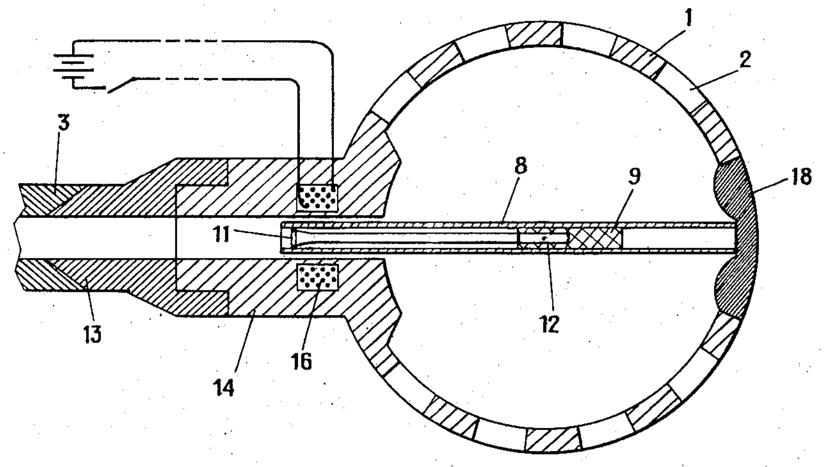
FIGS. 1D and 1E are cross-sectional views of the preceding cartridge in firing position in the sphere, the induction coils of the sphere being placed differently in these two forms.

In that case, the explosive charge 9 is placed in the tube 8 of the cartridge so that it is substantially in the center of the sphere 1 when the end of the cartridge is thrust against the centering part 18 (position illustrated in FIG. 1D).

As can be seen from this figure, firing is effected by exciting the primary coil 16 by closing the circuit connecting the battery on the surface installation to the coil terminals.

Figure 1E:
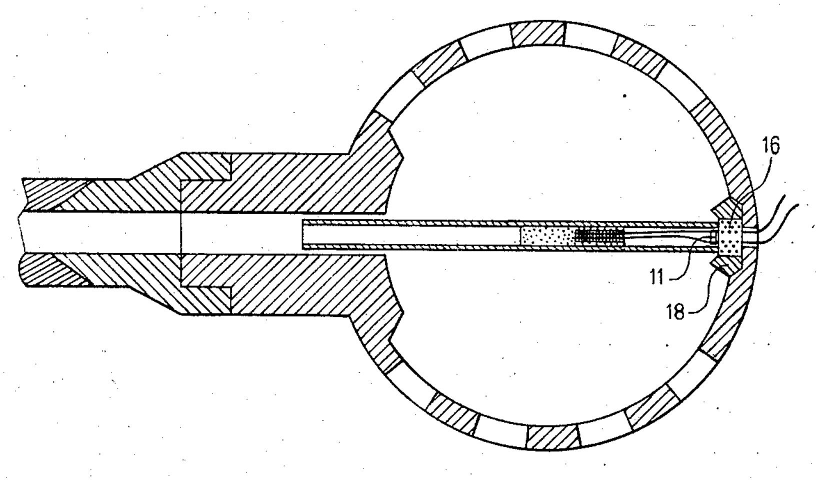

In FIG. 1E, the coil 16, instead of being connected to the terminal of the sphere, is placed inside the sphere, diametrically opposite to the coupling 14, and is surrounded by the centering part 18.

The cartridge is then substantially the same as in FIG. 1D, but it is the end of the cartridge containing the coil 11 which is then thrust against the end of the sphere diametrically opposite to the tube, i.e. against the coil 16 at the place shown in FIG. 1E.

Figure 1F:
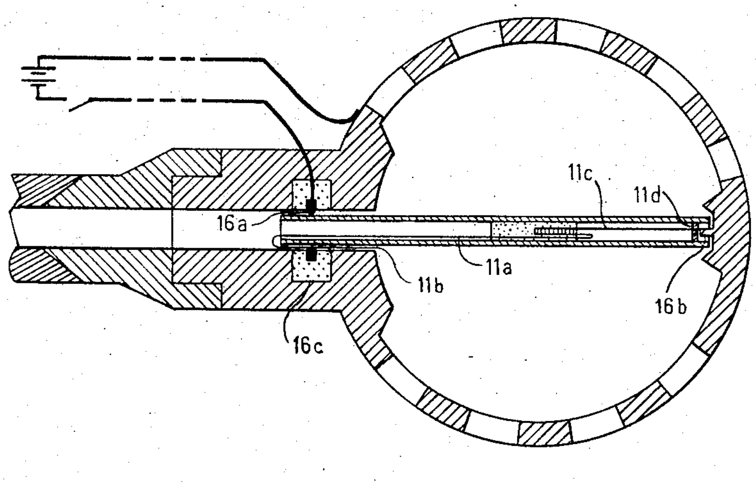
FIG. 1F is a cartridge of the same type placed in the sphere and with its ends in electrical connection with conductors.

FIG. 1F illustrates a firing system working by direct electrical contact instead of by induction.

The electric wires 11*a* and 11*c* of detonator 12 (FIG. 1D) are connected to contact elements 11*b* and 11*d* respectively. When the cartridge of FIG. 1F is in its place, i.e. its outer end is thrust against the centering part 18 in electrical contact with the metal sphere, these contact elements make electrical contact with contact 16*a* which is electrically insulated from the sphere by insulator 16*c*, and with contact 16*b* integral with the sphere.

As is shown in FIG. 1F, the contact 16*a* may be in the form of an annular ring. Contact 16*b* may jut out in relation to the stop of the centering part 18 and its diameter may be less than the inside diameter of the cartridge, so that it can go into the end of the cartridge in order to make contact with element 11*d*. As the figure shows, firing is caused by operating the switch in the circuit connecting the two poles of a battery with the annular contact 16a and with the metal sphere, respectively.

Figures 2, 2A:
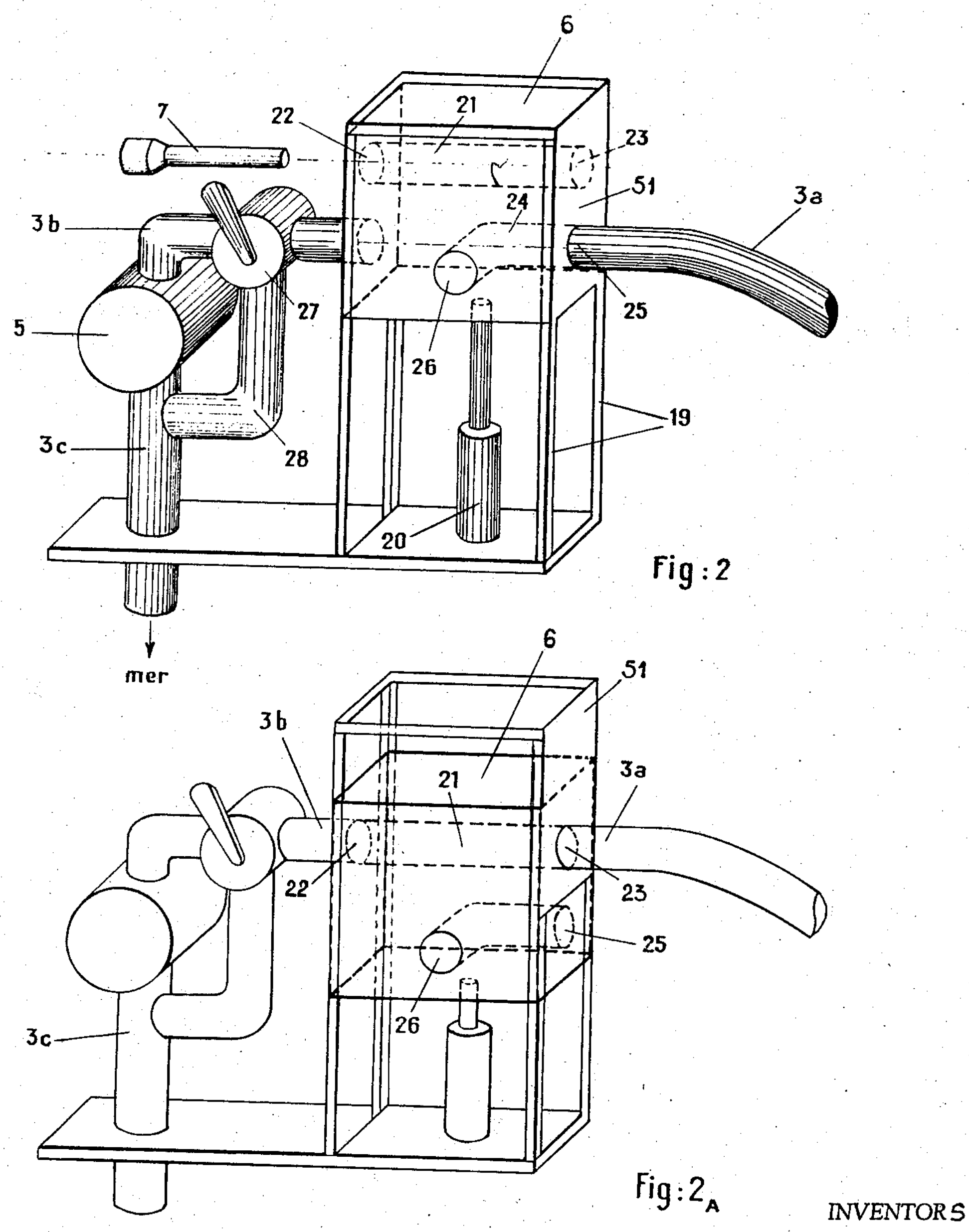
FIGS. 2 and 2A show diagrammatically in two different positions a slide-type cartridge distributor of the type shown in FIG. 1.

The slide-type cartridge distributor 6 illustrated in FIGS. 2 and 2A is placed on the boat. It is able to slide vertically along guide-rods 19 (FIG. 2) by means of an hydraulic jack 20. The upper part of the distributor is crossed by a rectilinear tube running from one side of the distributor (orifice 22) to the side diametrically opposite (orifice 23). The lower part of the distributor 6 is crossed by a tube 24 of the same inside diameter as the tube 21. It may be bent and one orifice 25 comes out on the same side of the distributor as the orifice 23, and in the same vertical alignment. The other orifice 26 of tube 24 may come out, for example, one one of the sides of the distributor adjacent to the orifice 25.

In the position shown in FIG. 2 (distributor 6 up), the orifices of the tube 21 are open and the cartridge 7 can be inserted in this tube through this orifice 22, for instance. The opposite orifice 23 is thereafter closed by a panel 51 fixed to the upper parts of guide-rods 19.

In this position, the orifice 25 of the tube 24 coincides with the cross-section of part 3a of the flexible tube connecting the cartridge distributor to the sphere. As there is no orifice directly opposite orifice 25 in the distributor 6, part 3b of the flexible tube between the pump 5 and the distributor is closed by the distributor wall. The water circulation set up by the pump 5 in the portions of the flexible tube 3c submerged in the sea, and in 3b, is then diverted by a two-way valve 27 to the tube 28 connecting the valve 27 to the tube 3c.

In the position shown in FIG. 2A, the distributor 6 has been lowered along the guide-rods until the part 3a and 3b of the flexible tube come into connection with the tube 21 at the level of the orifices 22 and 23, respectively. In this position, with the pump 5 working permanently, a valve 27 is operated so as to close a tube 28 and establish water circulation in the portions 3b and 3a of the flexible tube, through the distributor tube 21.

When tube portions 3a and 3b are in connection with the tube 21, the cartridge 7 previously placed there will be carried along by the current of water in the tube 3 (FIG. 1) until it reaches the sphere 1. To prevent it from arriving too suddenly at the sphere, the speed of the cartridge 7 may be reduced or retarded a little before the end of its travel by water discharge pipes 29 connected to the flexible tube 3 just in front of the sphere so as to create a pressure drop at the end of this tube. These pipes 29 may be arranged so as to form a partial streamlining of the sphere, as shown in FIG. 1. The discharge of water into the sea by the pipes 29 exerts a reaction force on the stream-lining, assisting the forward movement of the immersed device when the boat is in movement.

When the cartridge 7, at the end of its travel, arrives in the sphere in the manner illustrated by FIG.1B for instance, the secondary coil 11 of the cartridge being opposite the coil 16 of the sphere terminal, the valve 27 (FIG. 2) is operated so as to close the tube 3b and establish water circulation through the tube 28. The hydraulic jack 20 is then operated so that the distributor 6 rises along the guide-rods 19 until the orifice 25 of the tube 24 coincides with the opening of the tube 3a.

Firing box 17 is then operated (FIG. 1). The electric current induced in the cartridge coil sets off the detonator 12 (FIG. 1B), which explodes the charge 9 in the center of the sphere.

The sound waves resulting from the explosion, after being reflected from the undersea strata, are then recorded by a receiving device not shown.

The water forced back at the moment of the explosion in the flexible tube 3 is partly discharged through the pipes 29 and partly by the tube 24 of the distributor 6 (FIG. 1) while another cartridge is placed in the tube 21 of the distributor.

The hydraulic jack is then operated to bring the distributor down until the tube 21 is in line with the tubes 3a and 3b. Valve 27 is then operated to establish water circulation through the tube 21 to send another cartridge into the sphere to commence another cycle.

Figures 3, 3A:
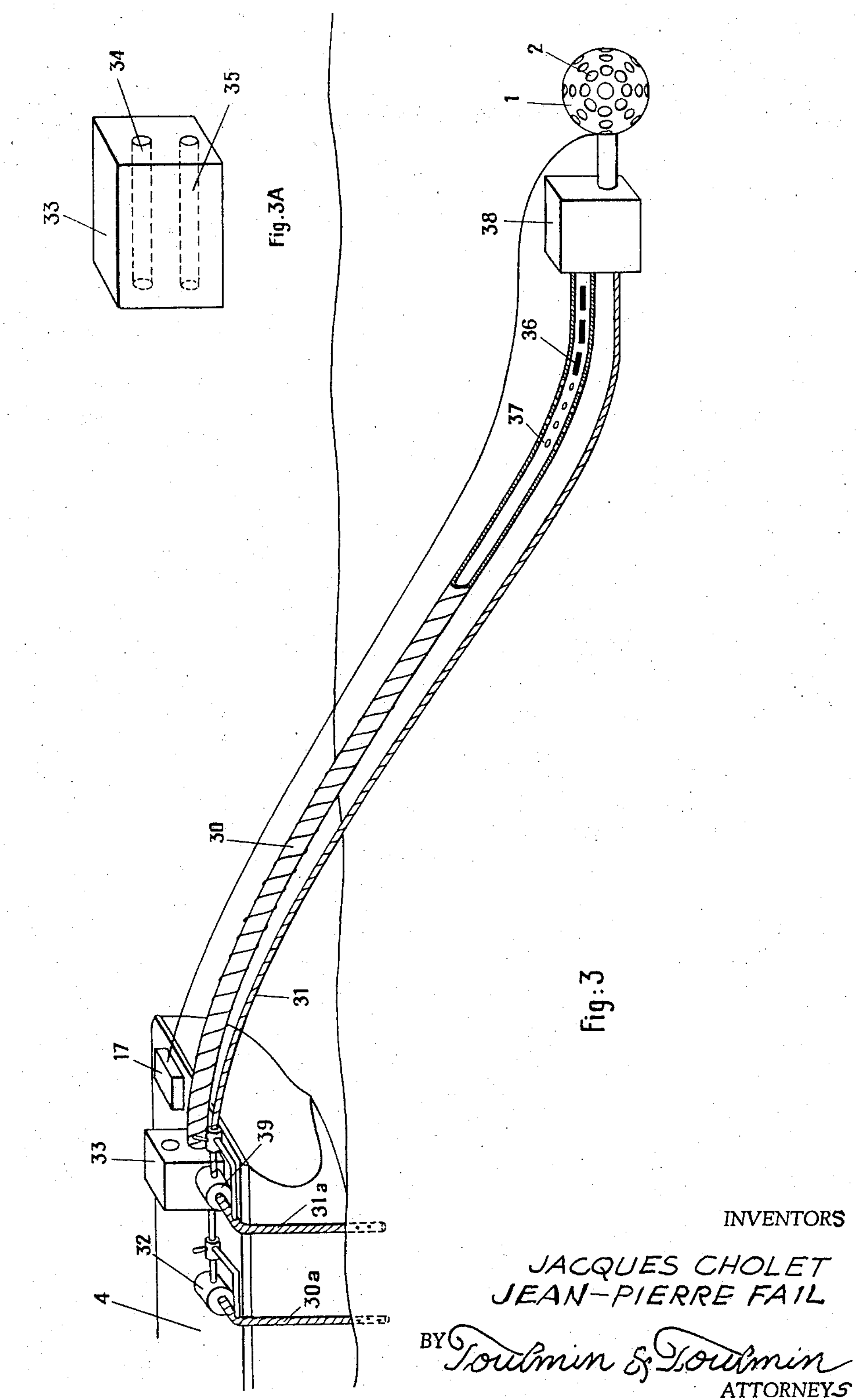
FIG. 3 shows, in a longitudinal partial cross-section, a modification of the first method of constructing the device.
FIG. 3A shows diagrammatically the inside arrangement of the cartridge distributor used in that modification.

FIG. 3 represents a variant of the first system in which the device comprises two flexible tubes 30 and 31. In one of these tubes, 30, sea-water is circulated after passage through tube 30a, pump 32 and cartridge distributor 33.

This distributor, which moves vertically by a hydraulic jack in a similar manner to the distributor 6 in FIG. 2, is simpler than the previously described distributor. Two rectilinear tubes (34 and 35 in FIG. 3A) run through it, each terminating on opposite sides of the distributor. Water is circulated alternately through each of the two tubes, while a cartridge is placed in the tube that is not connected to the flexible tube. By this system cartridges are dispatched at regular intervals, their outside diameter being somewhat less than the inside diameter of the tube, taking into account the curvature of the latter. These cartridges 36 after being forced down along the tube, are slowed down near the immersed end of the tube by holes 37 through which water from tube 30 escapes to produce a pressure drop, and are then stored at the free end of the tube. This immersed end of the tube 30 is connected to a device 38 which is described below and is designed to transfer the cartridges from the tube 30 into the sphere 1.

Permanent water circulation is established in the second flexible tube 31 by means of a pump 39 linked with the sea by tube 31a. The other end of the tube 31 is connected to the transfer device 38, the latter being connected to the sphere 1. A water circulation short-circuiting system, similar to that represented in FIG. 2, is placed on each of the flexible tubes 30 and 31 so as to stop the water circulation in these tubes without stopping the operation of pumps 32 and 39, according to the distribution requirements of the circuit.

The slide type transfer device 38, the operational principle of which is illustrated in FIG. 4 to 4D, is of the same type as the distributor 6 represented in FIG. 2 and works on the same principle, by means of a hydraulic jack (not shown in the drawing) giving it a vertical movement along guide-rods (also not shown). It comprises a first tube 40 the orifices 41 and 42 of which are on two adjacent sides of the slide 38, and a second rectilinear tube 43 the orifices 44 and 45 of which are on two opposite sides of the slide 38, one of these orifices 44 being placed on the same side and in the same vertical alignment as the orifice 41 of the tube 40. The slide 38 is interposed between the tubes 30 and 31 while an obturation plate 46 placed in a vertical plane opposite the end of adjacent tube 30, and the terminal 14 of the sphere 1 which is in alignment with tube 31.

In FIG. 4, the slide 38 is in the highest position, the tube 40 communicating with no other element while the tube 43 is placed in alignment with tube 30 and orifice 44 is closed by the plate 46. Any connection between the tube 31 and the sphere 1 is broken by the wall of the slide 38. At this moment, the cartridge 37 at the end of the tube 30 is pushed into the tube 43 by the current of water.

In the next position, FIG. 4A, the slide 38 has come down, so that the tube 43 is placed in the extension of the tube 31 and the terminal 14 of the sphere 1. The water circulation set up in the tube 31 dispatches the cartridge 37, which is in the tube 43, into the sphere 1. Another cartridge has in the meantime arrived at the end of the tube 30 which is closed by the adjacent wall of the slide 38 which is not perforated at that place.

When the cartridge 37 is placed in the sphere 1 for explosion, as illustrated in FIG. 1D for instance, the slide 38 comes down again and takes up a third position, represented in FIG. 4B. Tube 43, from which the cartridge has been discharged, communicates with no element of the device. The ends of the tubes 30 and 31 are closed by the adjacent side of the slide 38. Tube 40 is then in registration with terminal 14 of sphere 1. At that moment the firing box 17 on the boat (FIG. 3) is operated and the cartridge 37 is exploded in the sphere 1 in the manner already described. The water forced back into the tube 40 by the explosion is discharged through the orifice 42.

After the explosion, the hydraulic jack (not shown) is operated to bring the slide 38 up again into the position shown in FIG. 4C. Tube 43 is again placed in alignment with tube 31 and with terminal 14 of the sphere. The water circulation from the tube 31 is also established in the tube 43 and the terminal 14, so as to clean out the sphere and remove any foreign matter.

After the time necessary for that sweeping-out operation, the slide 38 moves up again to the position shown in FIG. 4D, identical with FIG. 4. All circulation is stopped between the tube 31 and the terminal 14 of the sphere 1, due to the interposition of the wall of the slide 38. Tube 43, placed in alignment with tube 30, has its orifice 44 blocked by the plate 46 and receives another cartridge. The cycle then recommences as before.

Figure 5:
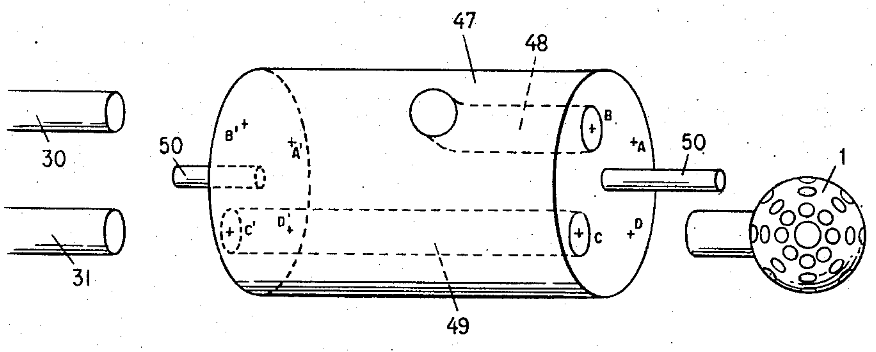
FIG. 5 shows diagrammatically a barrel-shaped device that can be used instead of the sliding part shown in FIG. 4.

Both methods of utilizing the device as described above as examples can be slightly modified while remaining within the scope of this invention. For example, the distributor 6 represented in FIG. 2 or the transfer device 38 represented in FIG. 4 can be replaced by a rotary drum such as illustrated in FIG. 5.

This drum 47 comprises two internal tubes 48 and 49 placed substantially in the same way and playing the same role as the tubes 40 and 43 of the distributor 38. Drum 47 revolves around a longitudinal axle 50, bringing the tubes 48 and 49 successively into communication with the flexible tubes 30 or 31 and with sphere 1, in the same timed sequence as shown diagrammatically in FIGS. 4 to 4D.

Another type of distributor that may advantageously be used on the boat is illustrated in FIGS. 6 and 7A to 7C.

This device enables the cartridge to be put in place with maximum safety. It comprises a rotary distributor 58, the stator 66 of which has orifices 63, 64 and 65, the orifice 63 formed an extension of tube 3 and of which the rotor 59 comprises a diametrical pipe 60 running straight through it and having a diameter greater than the widest diameter of the cartridges, this diameter being advantageously equal to the inside diameter of the tube 3. This diametrical pipe 60 communicates with two radial pipes 61 and 62 of the rotor, the three internal pipes of the rotor co-operating with orifices 63, 64 and 65 (not diametrically opposed) of the distributor stator 66, so that when the pipe 60 is in alignment with the tube 3 and the orifice 63, no other pipe communicates with the orifices 64 and 65 (FIG. 7A), when the pipe 60 is in alignment with orifice 64, pipe 62 will be in alignment with tube 3, the pipe 61 communicating with no orifice (FIG. 7B), and finally, when the pipe 60 is in alignment with orifice 65, the pipe 61 will be in alignment with tube 3, the pipe 62 then communicating with no orifice (FIG. 7C).

Figure 7A:
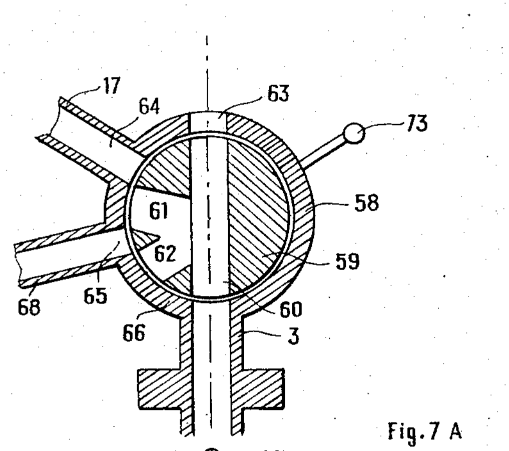
FIGS. 7A, 7B and 7C show in cross section the function of the rotary cartridge distributor shown in FIG. 6.
Figure 7B:
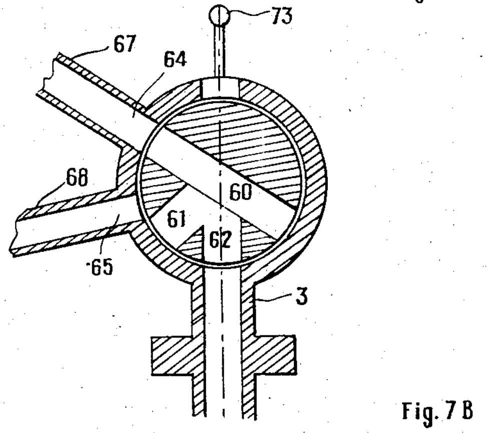
Figure 7C:
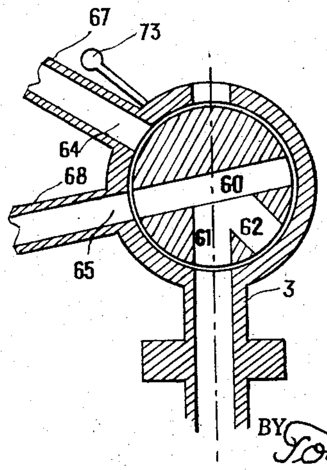

In the construction corresponding to FIGS. 7A to 7C, in which pipes 60, 61 and 62 and orifices 63, 64 and 65 have the same diameter, the above-mentioned conditions are attained when the angular interval (measured in relation to the rotor axle) between pipes 60 and 62 is equal to the angular interval between orifices 63 and 64, and the interval between pipes 60 and 61 is equal to the interval between orifices 63 and 65.

Figure 6:
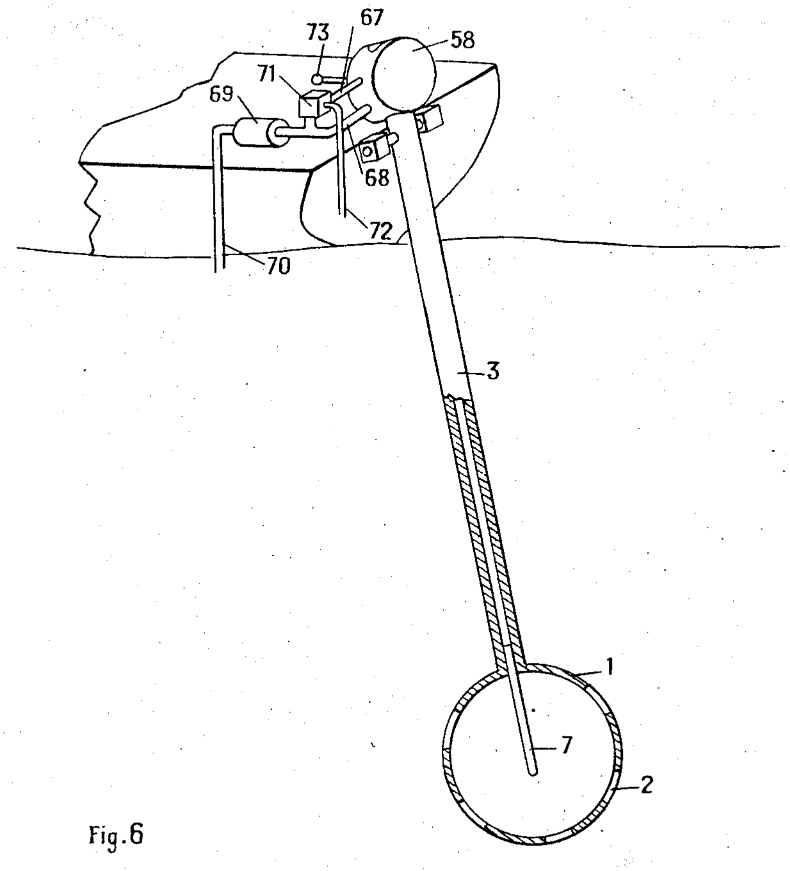
FIG. 6 shows a longitudinal partial cross-section of a modified construction using the device according to the invention, utilizing a rigid tube to connect the sphere to the surface installation.

Orifices 64 and 65 of the stator 66 of the distributor are connected respectively to pipes 67 and 68, the pipe 68 being fed with water under high pressure (e.g. around 6 kg./cm.$^2$) by a pump 69, which is itself fed with water through a pipe 70, and the pipe 67 being fed with water at a lower pressure (e.g. around 0.1 kg./cm.$^2$) by the pump 69 through a pressure-reducer joined to a discharge tube 72 (FIG. 6).

The device operates substantially as follows:

To insert the cartridge, the pipe 60 of the rotor is aligned with the tube 3 and the orifice 63 (FIG. 7A). Rotor rotation can be controlled manually by a lever 73. The cartridge inserted through the orifice 63 falls into the tube 3. The rotor is then turned until the pipe 60 is in alignment with orifice 64 (FIG. 7B). The low pressure water of the pipe 67 then passes into the tube 3 through the pipes 60 and 62, and pushes the cartridge gently along, which avoids the risk of destroying the cartridge before it is in place. Finally, after the explosion, to evacuate cartridge matter, the tube is placed in communication, through pipes 60 and 61 (FIG. 7C), with the pipe 68 of high pressure water which washes any cartridge matter remaining in the tube into the sphere and then out through the sphere orifices.

When a rigid tube is used to feed the sphere with cartridges (FIG. 6) the tube must be integral with the distributor stator, and the distributor water supply tubes 67 and 68 will preferably be flexible. This enables the tube to be fixed to the boat in such a way that the former can be pivoted and its inclination modified as illustrated in FIG. 7.

Whether flexible or rigid, the tube ulitized must be electrically insulated inside, and the cartridge must also be made of a material which is not a conductor of electricity, such as, for instance, glass, which has the further advantage of breaking easily into a large number of pieces at the moment of the explosion. These pieces can be evacuated through the sphere orifices between successive explosions.

FIGS. 8, 9, 10 and 10A illustrate another method of using the invention according to which the terminal of the tube is connected to an explosion chamber fed separately with two or more components of an explosive mixture which is thus formed in the chamber. The latter is fitted with means of igniting the said mixture.

This method of implementation avoids using cartridges and a distributor for same.

Figure 8:
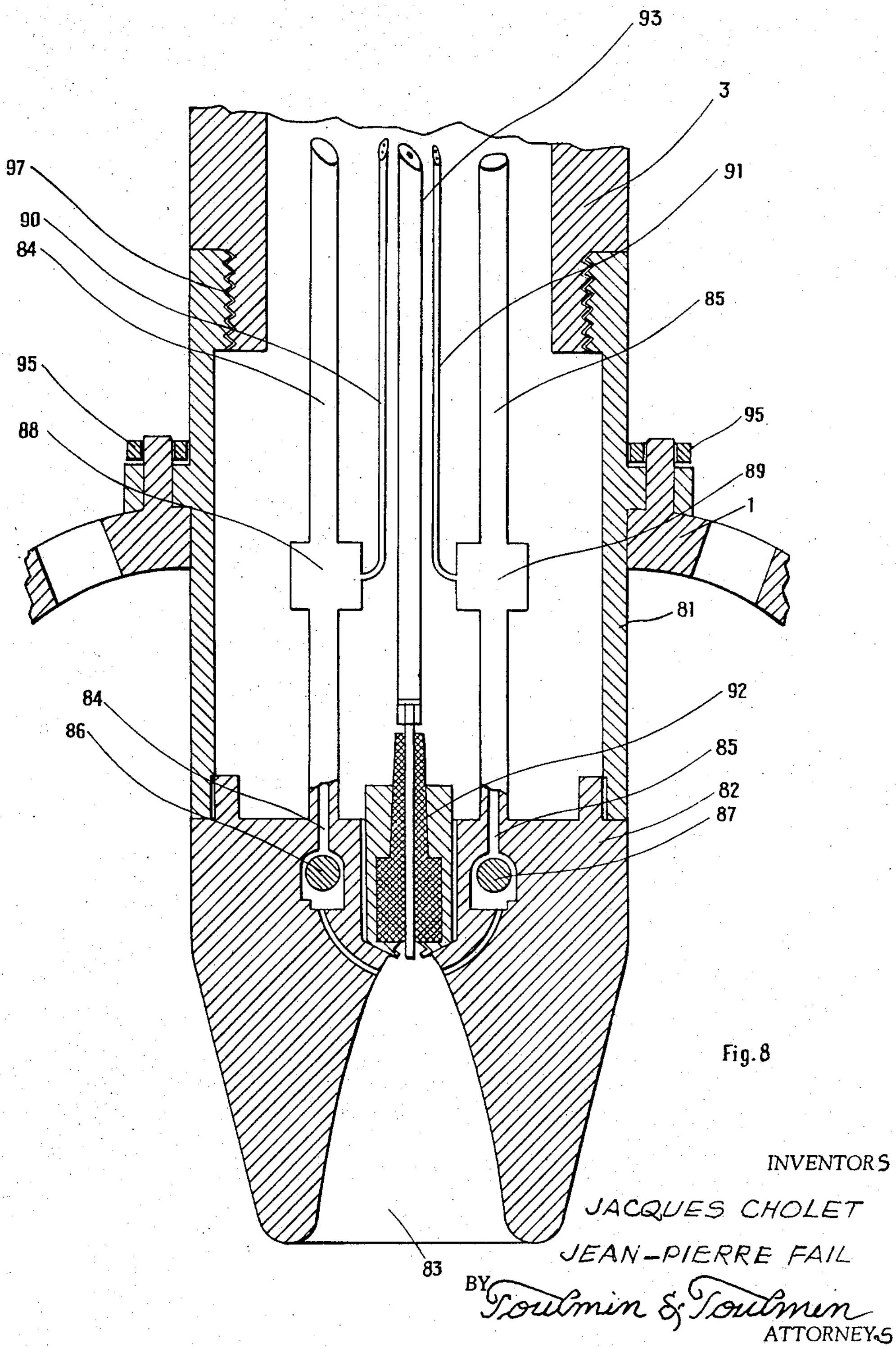
FIGS. 8 and 9 show another modification of the invention, by which the terminal of the tube that is fixed to the sphere ends in an open combustion chamber fed from the surface installation by separate conduits with various components of explosive mixture, and fitted with means of firing the said mixture, is controlled electrically from the surface installation.
Figure 9:
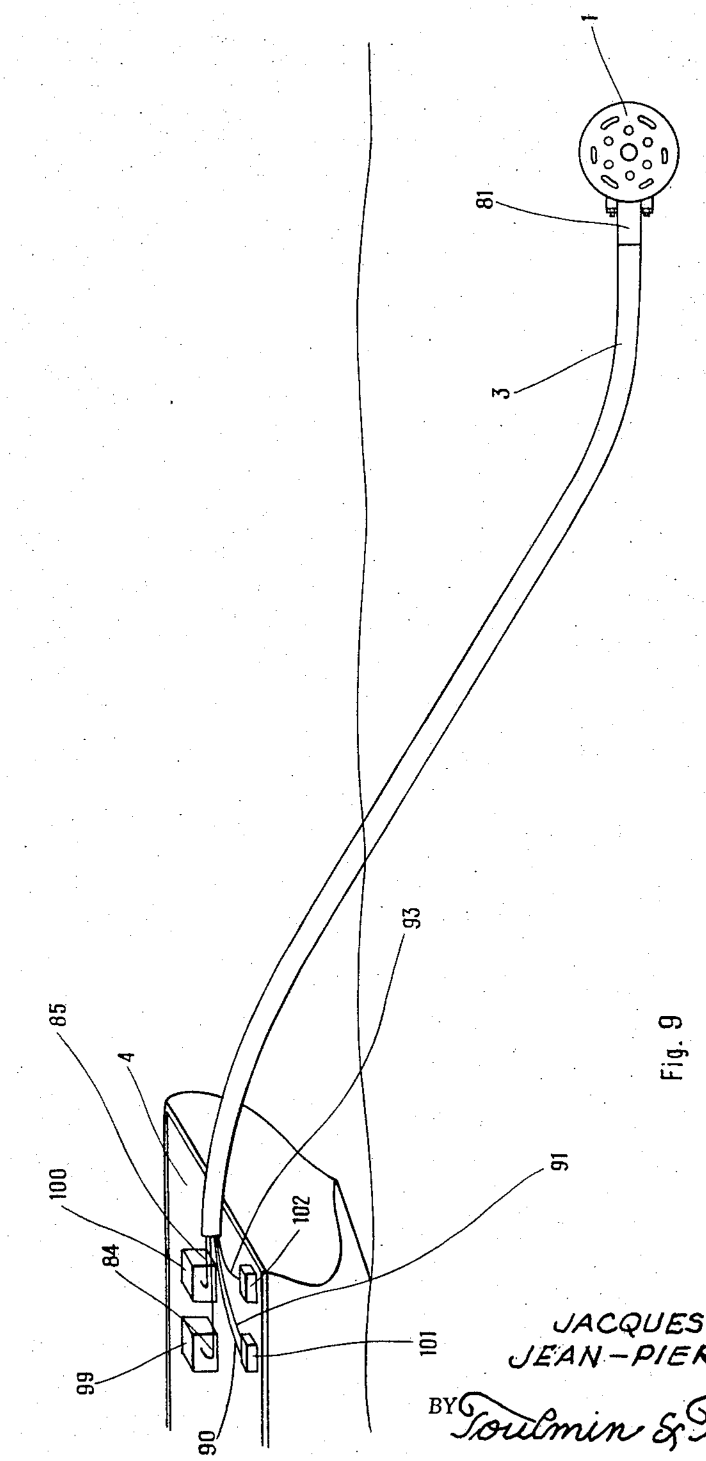
Figures 10, 10A:
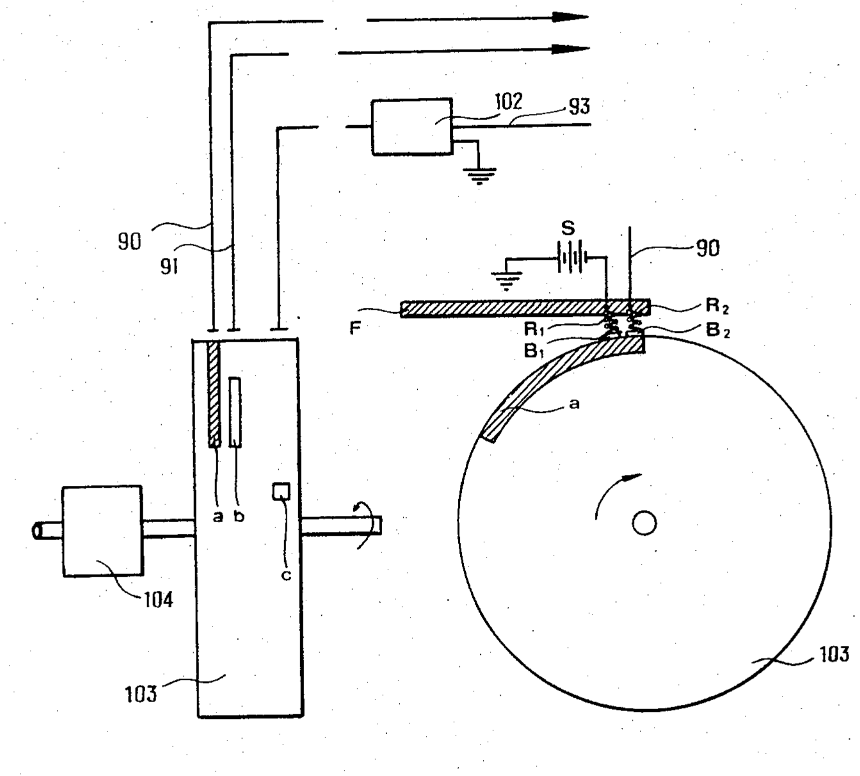
FIGS. 10 and 10A show diagrammatically a programming system used on the surface installation to assure, as and when required, the supplying of the explosion chamber with components of the explosive mixture and the triggering of the firing device.

This device, shown in FIG. 8 comprises essentially a metal cylinder 81 with an end piece 82 at one end in which a downwardly opening cavity has been formed to provide an explosion chamber. Two pipes 84 and 85 run through the cylinder 81 and open directly through end piece 82 into the combustion chamber 83. They are for conducting the liquid components of the explosive mixture to the explosion chamber, and are fitted with non-return valves 86 and 87. These pipes are fed by means of injection pumps of known type 88 and 89, operating electrically, the electric current being fed to them by conduits 90 and 91. A spark plug 92 electrically fed by a conduit 93 produces a spark in the neighborhood of the intake orifices of pipes 84 and 85 in the chamber at the moment chosen for igniting the explosive mixture. Cylinder 81 enters a perforated sphere 1, made of an explosion-resistant material (FIG. 9). The length of the sphere is such that the opening of the combustion chamber 83 is placed substantially in the center of the sphere. The latter is made integral with the cylinder 81 by means of fixing screws 95. Cylinder 81 is connected to the flexible tube 3 by its end opposite the chamber 83 by means of a screw thread 97 (FIG. 8).

Tube 3 connected to the boat by the end not containing the explosive device, as can be seen from FIG. 9, contains the pipes 84 and 85, as well as the electric conductors 90, 91 and 93. Pipes 84 and 85 are connected respectively to tanks 99 and 100 containing the liquid components of the explosive mixture, for instance a fuel such as nitrobenzene and an oxidizer such as nitric acid. The electric conduits 90 and 91 feeding pumps 88 and 89 are connected to a programming device 101 which controls the working of these pumps as required and which, through a firing box 102 and conduit 93 also controls the sparking of spark plug 92. A firing box of this type is described in U.S. Patent 3,133,231. The programming device 101 may consist of a drum 103 (FIGS. 10 and 10A) bearing contacts *a*, *b* and *c*, and driven by a motor 104. The contacts *a*, *b* and *c* are placed on drum 103 in such a way as to close the electric control circuits as required, with conductor 90, 91 and 93 respectively, controlling the injection pumps 88 and 89 and the spark plug 92.

The operation of the device according to the invention, as illustrated by FIGS. 8, 9, 10 and 10A, is as follows: the drum 103 being driven by the motor 104, the contacts *a* and *b* successively or simultaneously close pump circuits 88 and 89, according to the position chosen, through conductors 90 and 91, thus feeding the chamber 83 with liquid products from the tanks 99 and 100. The closing of one of these circuits is illustrated, as an example, in FIGURE 10A corresponding to a cross-section following a plane perpendicular to the drum axis of FIGURE 10 at the level of the contact *a*. According to this form of implementation, the contact *a* has the form of an annular sector in a conducting material.

Two brushes B1 and B2 bearing on a fixed element F are kept in contact with the cylindrical surface of the drum 103 by springs R1 and R2. One of these brushes B1 is connected to a power supply S, and the other B2 to the conductor 90, so that the current only passes through the latter conductor when the rotation of the drum 103 brings the brushes B1 and B2 in contact with *a*.

Similar devices can be used, comprising for instance a cam on sector *a*, mechanically operating a switch which makes contact between the power supply circuit S and conductor 90, when the cam passes before an index mark or, by its passage, operates a probe. The quantity of each of the liquids admitted into the chamber is regulated by the length of the contacts *a* and *b*, and the moment of admission by the placing of these contacts. The explosive mixture then forms in chamber 83. Contact *c* is placed on the drum 103 so that it closes the circuit of the spark plug 92 by the conduit 93 and the firing box 102, just an instant after the end of admission of the explosive mixture components. Spark plug 92 then produces a spark which brings about the explosion of the mixture. The feed-spark cycle is reproduced at each turn of the drum, the explosion rate being regulated by the rotation speed of the drum, i.e. the rotation speed of the motor 104.

The form of implementation which has just been described is given purely as an example and may be varied while remaining within the scope of this invention. For example, the number of liquids composing the explosive mixture does not have to be limited to two, but can be chosen at will according to the nature of the desired mixture. In that case, the device will comprise as many pipes supplying the chamber with liquids, and as many pumps, as there are components of the mixture. The outlet apertures of the feed pipes must be so placed in the explosion chamber that the mixture will be made in the best conditions, as well as the ignition of the mixture.

There can also be a double system for supplying the chamber with liquid products, one of these systems supplying a poor explosive mixture the components of which will be injected first, the other supplying a rich explosive mixture the components of which will be injected just before ignition, near the spark plug.

Whatever the method of implementation envisaged for bringing about the explosions (with cartridges or making the explosive mixture directly in a combustion chamber), it will always be advantageous, when a flexible tube is being used to employ a device for handling the tube and sphere of the type shown in FIGURES 11, 11A, 11B and 12.

Such a device enables the flexible tube and sphere, of which the weight may, for instance, be some 500 kg., to be simply and quickly lowered and raised from the surface installations with a minimum of effort.

This handling device comprises a convex track, articulated by one of its ends to the stern of the boat and on which the flexible tube can run, and separate handling means respectively for the said track, the metal sphere and the unimmersed end of the flexible tube, each of these handling means being comprised of a cable, one end of which is fixed to the element to be handled and the other wound on a winder after passing over a pulley.

Articulation of the track to the stern of the boat enables it to be folded back against the stern after use. It therefore takes up but little space. The cable fixed to the other end of the track enables it to be lifted up when commencing to use the firing system. The other cables, one fixed to the unimmersed end of the flexible tube and the other to the metal sphere, enable quick placing and raising of the firing system over the track.

Figure 11:
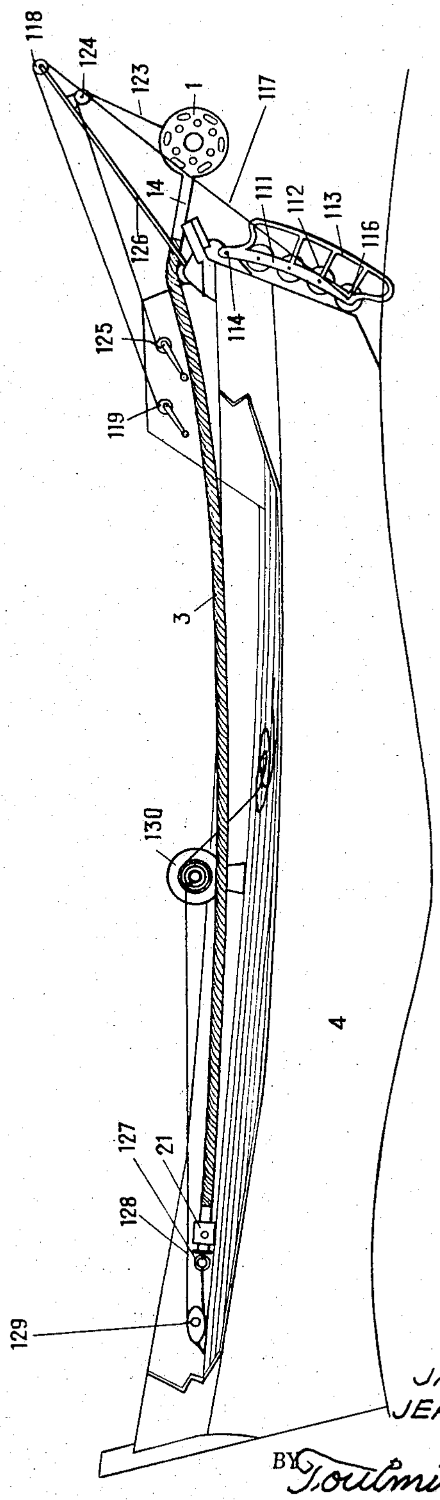
FIGS. 11, 11A and 11B are overall views of a handling device for using a flexible loading tube and enabling the sphere and tube to be raised and lowered from the ship. This device is in the on-board position in FIG. 11, is being lowered into the water in FIG. 11A and is in final position in the water in FIG. 11B.

On FIGURE 11, the track 111, with rollers 112 and hand-rails 113, is fixed at one end to the stern of boat 4 by means of a connection 114. The other end of this track is fixed at point 116 to a cable 117 passing over a pulley 118 and winding on to a winder 119 which is integral with the boat. The firing system, composed essentially of a perforated metal sphere 1, the rigid terminal 14 of which is connected to a flexible tube 3, occupies almost the whole length of the boat in the position represented in FIGURE 11. The metal sphere 1, remaining out of the boat, is fixed to a cable 123 passing over a pulley 124 and winding on to a winder 125 which is integral with the boat. Pulleys 118 and 124 are integral with a mast 126 suitably fixed at the stern of the boat and inclined above the water level. The end of the flexible tube 3 positioned, when not in use, at the bows of the boat, is fitted with a ring 127 to which is fixed a cable 128 passing over a pulley 129 integral with the boat and winding onto a reel 130 fitted with means of locking the cable.

When it is desired to commence firing operations, the firing system has to be lowered into the water and the device handled in accordance with the invention.

To that end, the reel 130 is first unlocked, freeing the cable 128, and the cable 123 is pulled up by means of the winder 125, thus raising the metal sphere 1, while at the same time it is moved slightly away from the boat, as is part of the flexible tube adjoining the terminal.

Sphere 1 is kept raised by the locking winder 125, while pulling up cable 117 by means of winder 119, thus raising the end 116 of the track 111 which pivots around connection 114. The track is then in the position shown in FIGURE 11A. It is kept in that position by the locking winder 119.

Winder 125 is then unlocked and the cable 123 is let out, so that the part of the flexible tube following the terminal 14 of the sphere comes into place on the track. Through the cable 123 this operation prevents the sphere terminal from coming onto the track, for its rigidity could cause deterioration of its connection to the flexible tube.

Figure 11A:
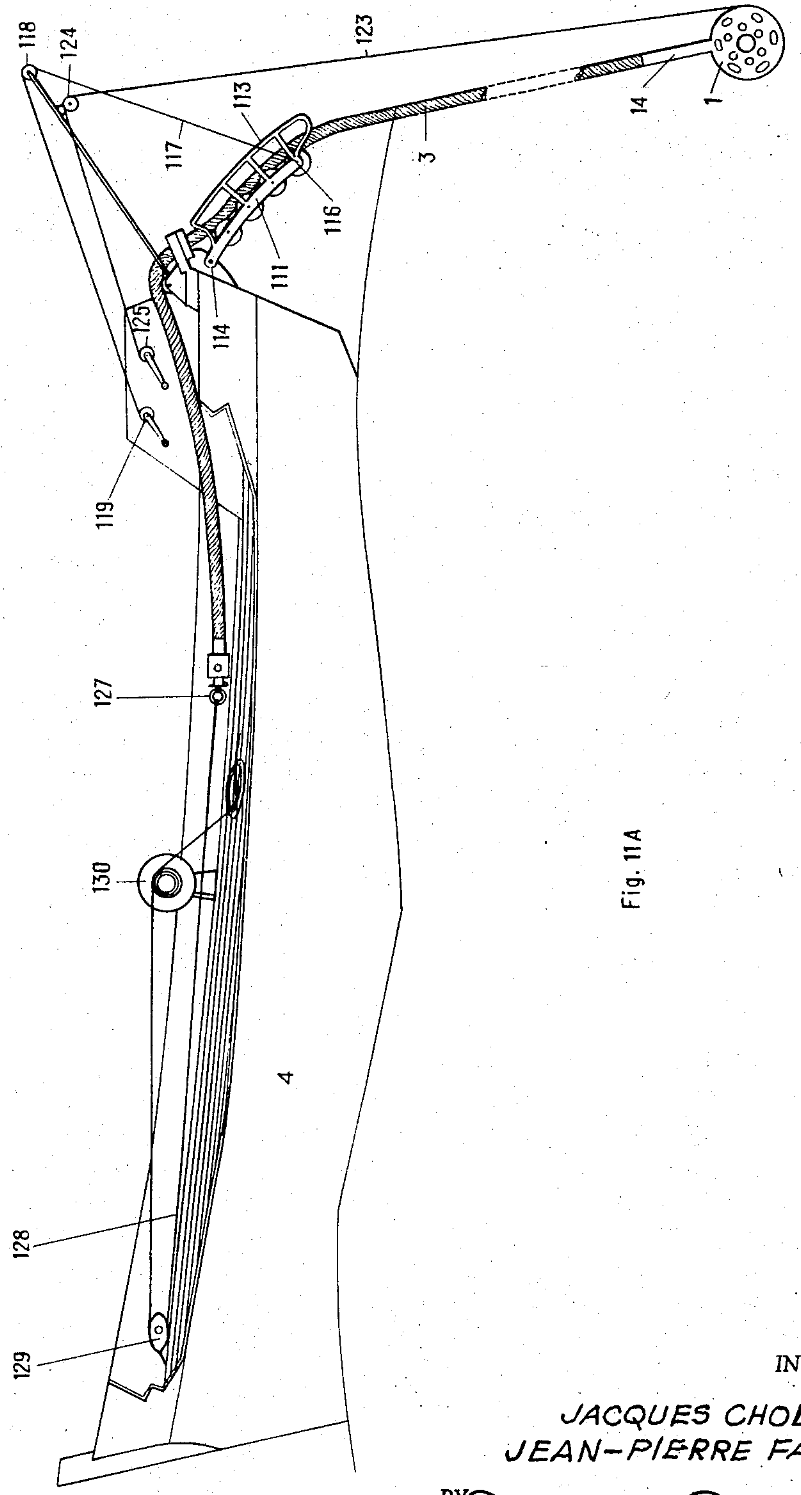
Figure 11B:
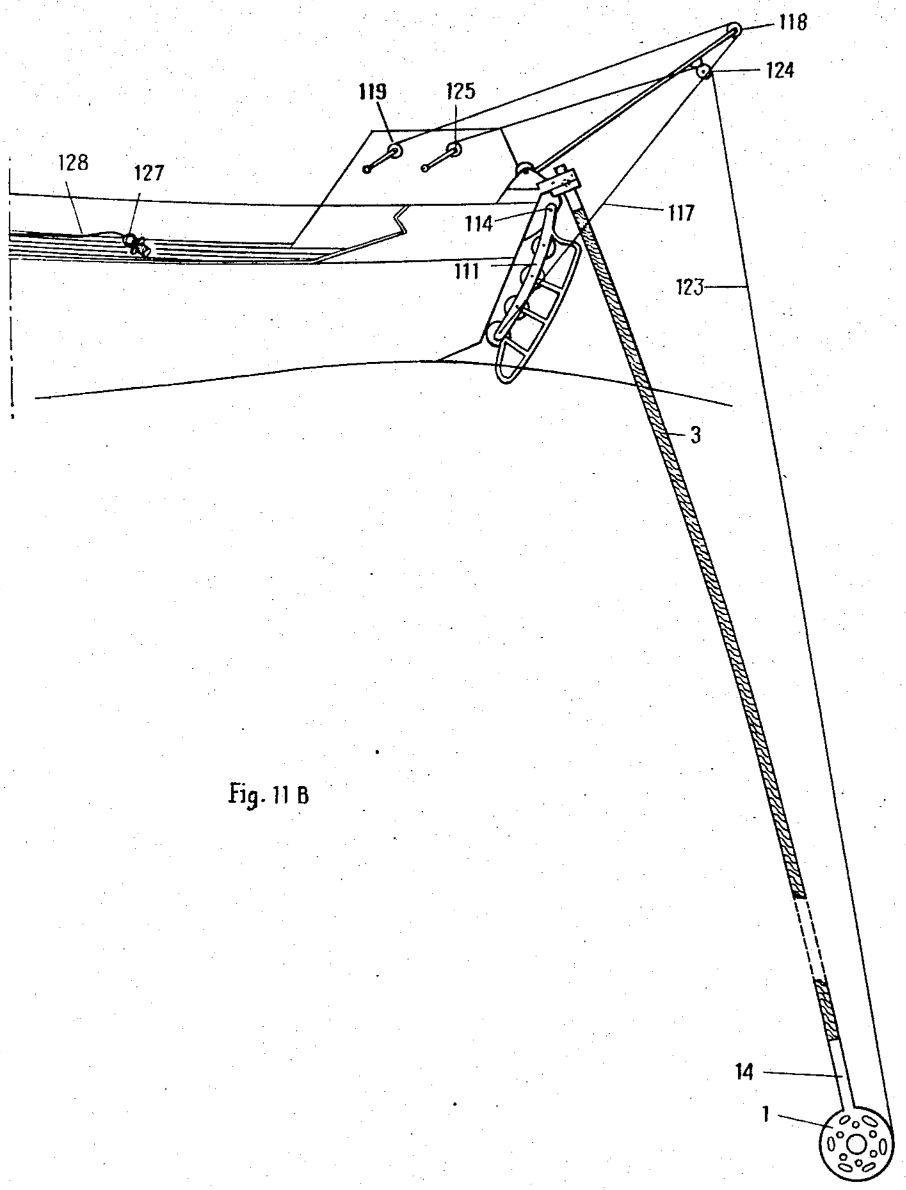

Tube 3, pulled by the weight of the sphere 1, is allowed to roll over the track, which remains held in the position represented in FIGURE 11A during this operation. The hand-rails 113 on each side of the track act as a guide for tube 3 during its lowering which goes on until its end fitted with ring 127 reaches the connection 114 where it is locked by means of an assembly of bearings which will subsequently be described. Winder 119 is then unlocked, which releases the traction on cable 117, thus enabling the track 111 to be folded back against the stern of the boat by pivoting around joint 114 (FIGURE 11B).

Figure 12:
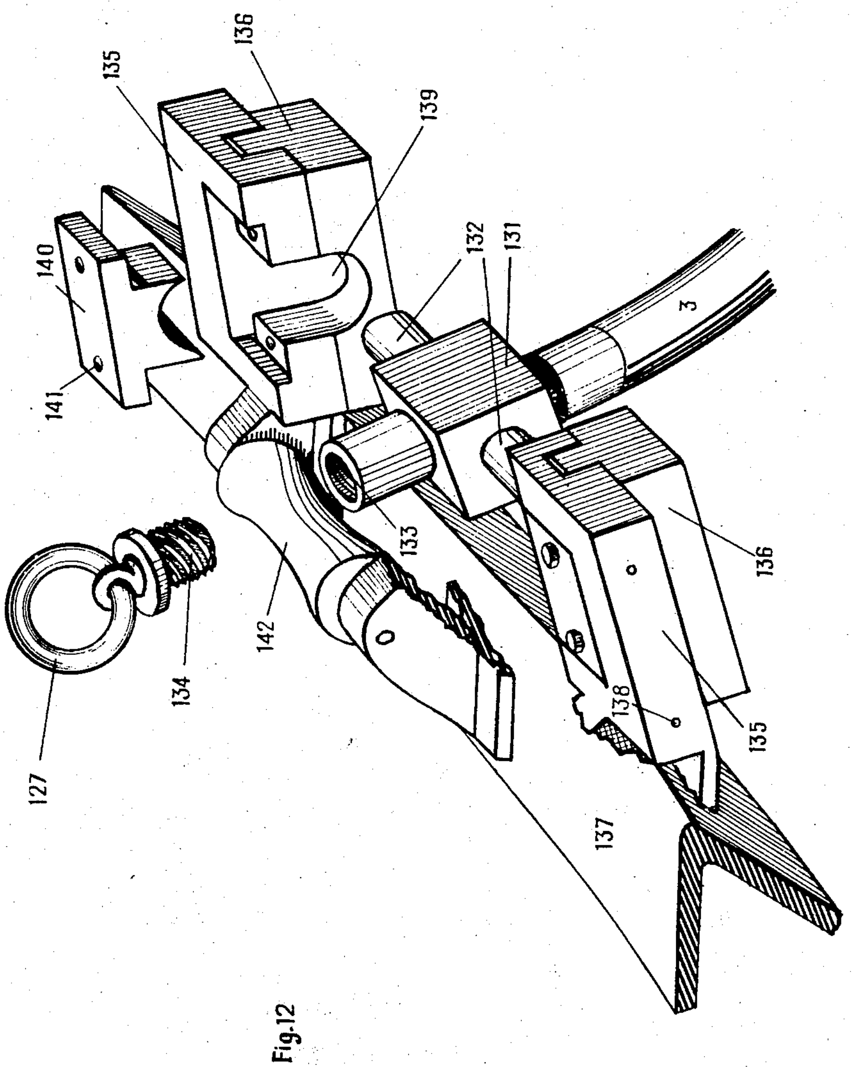
FIG. 12 shows an exploded view of the locking system of the non-immersed end of the flexible tube. It is used with the handling device shown in FIGS. 11, 11A and 11B.

The assembly of bearings enabling the non-immersed end of the tube to be locked at the entry to the track is illustrated in FIGURE 12.

The non-immersed end of the flexible tube 3 is joined to a part 131 fitted laterally with two diametrically opposed, projecting shafts 132. The end of the part 131 is not joined to tube 3 but bears a threaded part 133 in which the support of the ring 127 is screwed during the operation. Connection 131 fits in between two pairs of bearings 135 and 136.

Bearings 135 are fixed rigidly to the rail 137 of the boat, at the upper part of the name-board, near joint 114.

Bearings 136 are placed side by side under bearings 135 and are integral therewith, for instance by means of pins 138.

They are not fixed too firmly, so that they can fall out if, by chance, the metal sphere 1 or the tube 3 were held back by an obstacle. There is a cavity 139 in the upper part of each of the pairs of bearings 135 and 136, as shown in FIGURE 12, so that projecting shafts 132 fit therein when the connection 131 slides along, and they are then stopped by the lower part of the bearings 136. When the shafts 132 are resting on the bearings 136, they are kept in that position by adjusting a cover 140 on the upper part of each bearing 135 by means, for example, of screws 141. A certain amount of play is nevertheless left around shafts 132 so as to allow the connection 131 a rotary movement around them according to the movements of the flexible tube 3 when the boat is moving.

A roller 142 placed longitudinally on the rail 137 of the boat between the two clamps of the bearings 135, enables the flexible tube to slide easily above the rail of the boat.

When the connection 131 is in place, the support 134 of the ring 127, to which the cable 128 is connected, is unscrewed and the charging element from the pump-cartridge distributor device is joined up in its place. The firing system is then ready to work.

After a firing period, in order to replace the firing system on board, the previously described operation is carried out in the opposite sense.

The track 111 is raised by means of the cable, the connection 131 is unlocked by removing the covers 140 from bearings 135, the part 131 is disconnected from the pump-cartridge distributor device (not shown) and the support 134 of the ring 127 fixed to cable 128 is screwed in again. Tube and sphere are raised by means of the cables 128 and 123, running the tube over the track, until the terminal 14 of the sphere 1 comes up to the latter. The pulling on the cable 128 is then stopped, while the pull on cable 123 is continued, thus raising the sphere and its terminal. The track can then be folded back against the name board of the boat. Then, again pulling on the cable 128, the end of the flexible tube and the sphere terminal are pulled aboard.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A device for marine seismic prospecting by effecting series of underwater explosions at a high rate of succession, comprising a mobile installation and means for delivering explosive cartridges to locations substantially remote from said installation and at a predetermined depth to explode each of said cartridges at said depth, said means for delivering comprising tube means and means for sequentially conveying said explosive cartridges through said tube means from said installation to said locations, said tube means having a first end on said installation and a second end permanently immersed at said depth during the firing of said explosions, means on said installation for feeding explosive cartridges at a high rate into said first end, means for firing said explosive cartridges comprising conductors associated with said tube means, and switching means located on said installation for controlling by the closure of an electrical circuit, said means for firing at the times selected for the explosions.

2. A device according to claim 1, wherein said means for conveying are means for applying pressure to said explosive cartridges throughout said tube means.

3. A device according to claim 2, wherein said immersed second end is provided with means for stopping the cartridges in a position essentially exterior to said immersed end, and in which said means for conveying consist of a stream of water under pressure whereby the cartridge, after having reached said immersed second end, is maintained in abutment against said stopping means until the time for the explosion has arrived.

4. A device according to claim 1, characterized in that said immersed end is provided with means for attenuating bubble pulses.

5. A device according to claim 4, characterized in that said means for attenuating bubble pulses consists of a foraminous sphere.

6. A device for marine seismic prospecting by effecting a series of successive underwater explosions at a high rate from a mobile installation on the surface of the water by exploding cartridges, each at a location substantially remote from said installation and at a predetermined depth, said device comprising tube means and means for sequentially conveying said cartridges through said tube means from said installation to said location, said tube means having a first end on said installation and a second end permanently immersed at said location during the firing of said explosions, a distributor on said installation for feeding said cartridges at a high rate into said first end with means for firing said cartridges comprising conductors associated with said tube means, and switching means located on said installation for controlling, by the closure of an electrical circuit, said means for firing at the times selected for the explosions.

7. A device according to claim 3, characterized in that the explosive cartridges have an outer skirt of a material which is a non-conductor of electricity and which consists of a cylindrical body and a head of larger diameter than said body, said skirt containing an explosive charge and a detonator connected to two conductor wires to set off the detonator when a current passes through the wires, said two wires being electrically connected to two terminals of an induction coil secondary housed in the head of the cartridge, stopping means for the cartridges comprising a seat for the head of the cartridge aligned coaxially with a central bore of a diameter greater than that of the cartridge body, the primary of said induction coil being so placed as to be magnetically coupled with said secondary coil when the cartridge head is in abutment against said stopping means, the terminals of said primary coil being electrically connected by switching means to the terminals of an electric current source on the mobile installation.

8. A device according to claim 3, in which each explosive cartridge has a cylindrical outside skirt of a material which is a non-conductor of electricity, said skirt containing an explosive charge and a detonator connected to two conductor wires for setting off the detonator when a current passes through them, and wherein said stopping means for the cartridges are substantially in line with the submerged end of the tube and at a distance from said submerged end which is smaller than the length of a cartridge, said two wires being electrically connected to the two terminals of an induction coil secondary housed in the vicinity of one end of the cartridge, said stopping means being provided with the primary of said induction coil connected through insulated conductors and a switch to the terminals of a power supply on the surface installation.

9. A device according to claim 3, in which the explosive cartridges have an outer cylindrical skirt of a material which is a non-conductor of electricity, said cartridges containing an explosive charge and a detonator connected to two conductor wires for setting off the detonator when a current passes through the wires, and wherein said stopping means for the cartridges is substantially in line with said second end of said tube means and at a distance therefrom which is smaller than the length of a cartridge, said two wires being connected electrically, one to a first contact element, outside the cartridge near one end of the latter, the other to a second contact element of conductor material inside the cartridge near the other end of the latter, said stopping means being provided with a rearwardly protruding conductor, the submerged end of the tube being provided internally with a conducting ring adapted to contact said first contact element when the second contact element inside the cartridges comes into contact with said rearwardly protruding conductor of the stopping means, the said conductor ring being electrically insulated from the conductor element of said stopping means and connected to one power supply terminal through a switch while the other power supply terminal is electrically connected to said conductor element.

10. A device according to claim 3, in which the explosive cartridges have an outer cylindrical skirt of a material which is a non-conductor of electricity, said cartridges containing an explosive charge and a detonator connected to two conductor wires for setting off the detonator when a current passes through the wires, and wherein said stopping means for the cartridges is substantially in line with said second end of said tube and comprises a cartridge centering part at a distance from said second end which is smaller than the length of a cartridge, said two wires being electrically connected to the terminals of an induction coil secondary housed in one end part of the cartridge, an induction coil primary housed in the immersed end part of the tube so as to be magnetically coupled with said secondary when the end of the cartridge opposite to the end that houses the secondary is in abutment against said cartridge centering part, the explosive charge being so positioned in the cartridge that in the latter position of the cartridge the charge is substantially midway between the immersed end of the tube and the cartridge centering part of said stopping means.

11. A device according to claim 6, in which the cartridge distributor is a slide type distributor comprising a longitudinal, rectilinear tube whose ends are opposite sides of the slide to permit the tube to be loaded with cartridges, and a bent tube, one of the ends of which opens on the same side as one of the ends of the preceding tube and in the same vertical plane therewith, the other end opening on an adjacent side of the slide, allowing water forced back by the explosion to escape.

12. A device according to claim 6, in which the cartridge distributor is a drum-shaped distributor comprising a rectilinear, longitudinal tube, the ends of which are at opposite ends of the drum to permit loading of the tube with a cartridge, and a bent tube, one end of which is at one end of the drum and in the same vertical plane with the adjacent end of the recilinear tube, the other end of the bent tube lying in the cylindrical wall of the drum, allowing the water forced back by the explosion to escape.

13. A device according to claim 6, in which the cartridge distributor is a rotary distributor comprising a stator with a cylindrical cavity, a rotor having substantially the same diameter as the cavity in which it is house, the said rotor comprising a pipe which runs through it diametrically and communicates with at least one other radial pipe, the stator having a first orifice registering with the rotor at a point diametrically opposed to that of the orifice through which the tube enters said housing, and at least one other orifice in the rotor housing at an angular interval from the first orifice, taken in relation to the rotor axle, equal to the angular interval between the diametrical pipe and the radial pipe of the rotor, the latter orifice being connected to a water pipe under pressure.

14. A device according to claim 3, in which the immersed end of said tube means is provided with orifices to allow part of the water circulating in the tube to escape, so as to create a pressure drop and thus control the movement of the cartridges toward that end of the tube.

15. A device according to claim 1, in which the tube means is flexible and in which a magazine of explosive cartridges is connected to the tube near its immersed end.

16. A device according to claim 15, further comprising an immersed slide type distributor allowing the explosive cartridges stored in said magazine to be successively distributed to said immersed end of said tube means.

17. A device according to claim 15, further comprising an immersed drum type distributor allowing the explosive cartridges stored in the said magazine to be successively distributed to said immersed end of said tube means.

18. A device according to claim 1, further comprising on said installation a system for maneuvering the tube means comprising a longitudinal track of convex shape in its longitudinal direction provided with rollers rotatable about axes substantially perpendicular to said longitudinal direction, said track being articulated at one end to the stern of a boat and on which track said tube means can be moved, lifting means for said track, and separate handling means respectively for the immersed end and the non-immersed end of said tube means, said handling means comprising a cable with one end fixed to the element to be maneuvered and the other end wound on a winder after passing over a pulley.

19. A device according to claim 18, in which the track is connected, near its articulated end, to a means for connecting and locking with the non-immersed end of said tube means and said non-immersed end being fitted laterally with two projecting diametrically opposed shafts, the locking means comprising two pairs of bearings integral with the boat and said shafts being freely rotatable in said bearings.

References Cited

UNITED STATES PATENTS

| | | | |
|---|---|---|---|
| 18,107 | 9/1857 | Seaman | 114—235 |
| 1,500,243 | 7/1924 | Hammond | 181—0.5 |
| 1,658,873 | 2/1928 | Younkman et al. | 114—199 |
| 1,768,006 | 6/1930 | Seberg et al. | 9—26 |
| 2,016,838 | 10/1935 | Schat | 9—42 |
| 2,465,696 | 3/1949 | Paslay | 181—0.5 |
| 2,780,196 | 2/1957 | Jareckie | 114—235 |
| 2,877,859 | 3/1959 | Knudsen | 181—0.5 |
| 3,022,852 | 2/1962 | Pavey | 181—0.5 |
| 2,316,596 | 4/1943 | Kennedy | 102—23 |
| 3,002,454 | 10/1961 | Chesnut | 102—21 |
| 3,070,010 | 12/1962 | Robinson | 102—21 |
| 3,125,925 | 3/1964 | Ljungberg | 102—22 X |
| 3,185,093 | 5/1965 | Holinbeck | 102—28 |
| 3,274,933 | 9/1966 | Robinson et al. | 102—21.6 |

FOREIGN PATENTS

| | | |
|---|---|---|
| 407,923 | 1/1925 | Germany. |

BENJAMIN A. BORCHELT, *Primary Examiner.*

W. KUJAWA, *Assistant Examiner.*